(12) United States Patent
Cherukuri et al.

(10) Patent No.: US 10,936,549 B2
(45) Date of Patent: Mar. 2, 2021

(54) CLUSTER-WIDE CONTAINER OPTIMIZATION AND STORAGE COMPRESSION

(71) Applicant: CISCO TECHNOLOGY, INC., San Jose, CA (US)

(72) Inventors: Sunil Cherukuri, Cary, NC (US); Xiao Hu Gao, Chapel Hill, NC (US); Alexander B. Altman, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 960 days.

(21) Appl. No.: 15/461,291

(22) Filed: Mar. 16, 2017

(65) Prior Publication Data

US 2018/0267990 A1 Sep. 20, 2018

(51) Int. Cl.
*G06F 16/178* (2019.01)
*G06F 16/13* (2019.01)
*G06F 8/60* (2018.01)

(52) U.S. Cl.
CPC .............. *G06F 16/178* (2019.01); *G06F 8/60* (2013.01); *G06F 16/13* (2019.01)

(58) Field of Classification Search
CPC ......... G06F 16/13; G06F 16/178; G06F 16/25
USPC .................................................. 707/765, 766
See application file for complete search history.

(56) References Cited

U.S. PATENT DOCUMENTS

| | | | | |
|---|---|---|---|---|
| 9,122,697 | B1* | 9/2015 | Bono | G06F 16/13 |
| 9,507,694 | B1* | 11/2016 | Tibble | G06F 8/72 |
| 2006/0111880 | A1* | 5/2006 | Brown | G06F 8/20 |
| | | | | 703/1 |
| 2006/0184792 | A1* | 8/2006 | Berlin | G06F 21/51 |
| | | | | 713/165 |
| 2006/0223600 | A1* | 10/2006 | Wisdom | A63F 13/63 |
| | | | | 463/1 |
| 2006/0253848 | A1* | 11/2006 | Mathieu | G06F 8/61 |
| | | | | 717/168 |
| 2011/0010461 | A1* | 1/2011 | Lassila | H04L 12/14 |
| | | | | 709/231 |
| 2016/0162320 | A1 | 6/2016 | Singh et al. | |
| 2016/0330138 | A1 | 11/2016 | Thomason | |
| 2016/0378518 | A1 | 12/2016 | Antony et al. | |
| 2016/0378525 | A1 | 12/2016 | Bjorkengren | |

* cited by examiner

*Primary Examiner* — James Trujillo
*Assistant Examiner* — Fariborz Khoshnoodi (57) ABSTRACT

One embodiment includes identifying a common file associated with a first software container deployed on a host; adding a single copy of the common file to a common file pool maintained by the host, removing the common file from the first container and replacing it with a pointer to the copy of the common file in the shared file pool, and removing the common file from the first container and replacing it with a pointer to the copy of the common file in the shared file pool; identifying at least one unique file associated with the first container; and moving the unique file to the common file pool maintained by the host and removing the unique file from the first container and replacing it with a pointer to the copy of the unique file in the shared file pool.

20 Claims, 8 Drawing Sheets

CLUSTER-WIDE CONTAINER OPTIMIZATION AND STORAGE COMPRESSION

TECHNICAL FIELD

This disclosure relates in general to the field of computer networking, and more particularly, though not exclusively, to techniques for cluster-wide container optimization and storage compression in the field of computer networking.

BACKGROUND

Containers enable faster and simpler application deployment as compared to virtual machines ("VMs"). One of the benefits of containers as compared to VMs is the reduced footprint of the former due to storage layering provided by a union file system, such as advanced multi-layered unification filesystem ("AuFS"), for example. Although containers can share storage layers (e.g., via a union file system), the layers must be precisely the same and the containers must be co-located (i.e., located on the same host). The footprint of containers can be further reduced if container storage on a host can be optimized by modifying how the files are placed and referenced and then extending this cluster-wide, which translates into further storage optimization and a more efficient and less expensive cluster implementation.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

DETAILED DESCRIPTION OF EXAMPLE EMBODIMENTS

Overview

A method is described and in one embodiment comprises identifying by a network element comprising a processor and a memory device at least one common file associated with a first software container deployed on a host, wherein the at least one common file comprises a file that is common to both the first software container and a second software container deployed on the host; and, for each identified at least one common file, adding a single copy of the common file to a common file pool maintained by the host, removing the common file from the first container and replacing the common file removed from the first container with a pointer to the copy of the common file added to the shared file pool, and removing the common file from the first container and replacing the common file removed from the second container with a pointer to the copy of the common file added to the shared file pool. The method further includes identifying by the network element at least one unique file associated with the first container, wherein the at least one unique file comprises a file that is not common to any other software container deployed on the host; and, for each identified unique file, moving the unique file to the common file pool maintained by the host, and removing the unique file from the first container and replacing the unique file removed from the first container with a pointer to the copy of the unique file in the shared file pool.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object-oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A union file system is a filesystem service for Linux, FreeBSD, and NetBSD that implements a union mount for other file systems. It allows files and directories of separate file systems (known as branches) to be transparently overlaid, forming a single coherent file system. Docker is an open source software tool designed to make it easier to create, deploy, and run applications by using containers. Containers allow a developer to package an application with all of the parts it needs and deliver it as a single package. AuFS is a layered union file system, in which a read part and a write part are merged together. The common parts of the OS could be read only and shared among all of the containers on that host, and then each container could have its own mount (or layer) for writing. For example, beginning with a base image, changes are made and committed using Docker, which creates an updated image.

The updated image includes only the differences from the base image. When the updated image is to be run, the base is also needed, with the updated image being layered on top of the base using a layered file system (e.g., AuFS), which merges the different images together. Accordingly, two containers that have common libraries/packages/bins will have these common libraries/packages/bins put into one or more shared layers. The two containers have their own write layers, which are referenced via unique identifiers and preserve the directory structure of the original images.

Currently, this layering and optimization is performed only at each host level. Additionally, the layering is performed at the library/package level. For example, if 90% of a library/package is common between two containers, the library/package cannot be put into the shared layer. For example, each container will often have differences in config and setup files even in shared libraries/directories/layers. Embodiments described herein include methods to achieve further optimization at the file level and cluster-wide.

Figure 1:
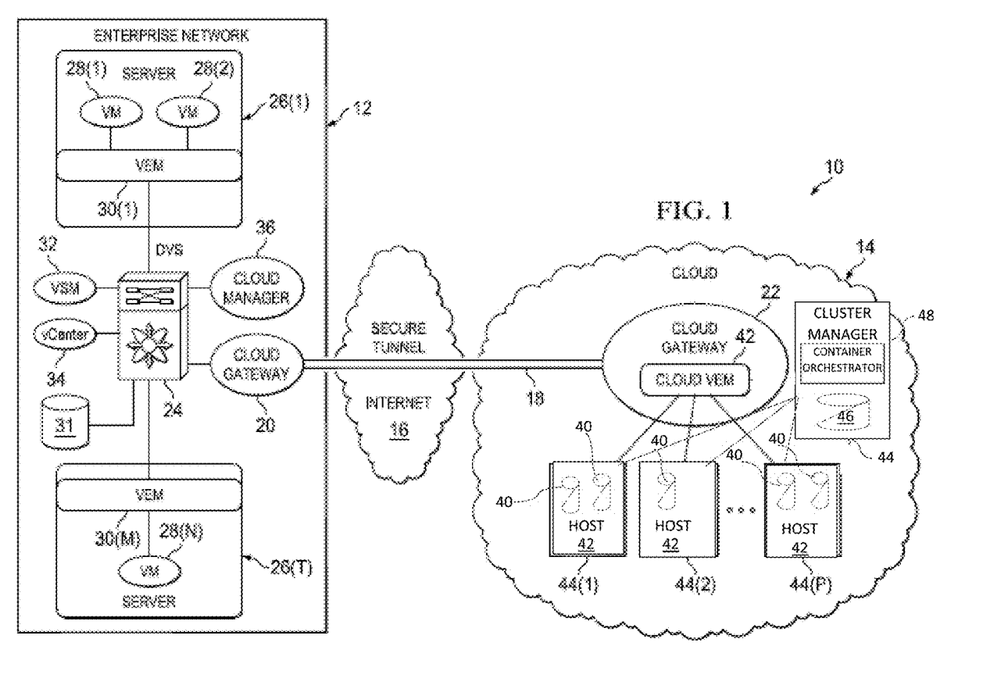
FIG. 1 is a simplified block diagram of a system for providing storage services in a cloud computing environment in which embodiments for cluster-wide container optimization and storage compression as described herein may be implemented.

FIG. 1 is a simplified schematic block diagram illustrating a communication system 10 for providing storage services in a cloud computing environment. In FIG. 1, an enterprise network 12 communicates with a cloud 14 over a public network, such as Internet 16, via a secure tunnel 18. In various embodiments, enterprise network 12 and cloud 14 form a hybrid cloud network environment. Enterprise network 12 can be any private network, such as a data center network, operated and controlled by a particular entity or organization. Cloud 14 is a collection of hardware and software ("cloud infrastructure") forming a shared pool of configurable network resources (e.g., networks, servers, storage, applications, services, etc.) that can be suitably provisioned to provide on-demand self-service, network access, resource pooling, elasticity and measured service, among other features. In various embodiments, cloud 14 can be deployed as a private cloud (e.g., a cloud infrastructure operated by a single enterprise/organization), a community cloud (e.g., a cloud infrastructure shared by several organizations to support a specific community that has shared concerns), a public cloud (e.g., a cloud infrastructure made available to the general public), or a suitable combination of two or more disparate types of clouds. Cloud 14 can be managed by a cloud service provider, who can provide enterprise network 12 with access to cloud 14 and authorization to set up secure tunnel 18 in accordance, for example, with a predetermined service level agreement (SLA). In particular, network resources within cloud 14 are not controlled by the particular entity or organization controlling enterprise network 12; rather, the network resources are allocated to enterprise network 12 according to the SLA with the cloud service provider. For example, enterprise network 12 can sign up to use a fixed amount of central processing unit processors, storage, and network services provided by cloud 14.

Secure tunnel 18 can connect a cloud gateway 20 in enterprise network 12 with a corresponding cloud gateway 22 in cloud 14. In various embodiments, secure tunnel 18 is an L2 secure tunnel (implemented using Layer 2 tunneling protocol) that connects cloud resources at cloud 14 with enterprise network 12. Secure tunnel 18 can be configured to cope with corporate firewall and network address translation (NAT), for example, from the nature of the transport level protocols (e.g. UDP/TCP) and the transport layer ports opened for hypertext transfer protocol (HTTP)/hypertext transfer protocol secure (HTTPS) in the firewall. [0019] In various embodiments, cloud gateway 20 is a virtual machine running in enterprise network 12, and cloud gateway 22 is a virtual machine running in cloud 14. Cloud gateway 20 can be responsible for establishing secure tunnel 18 for interconnecting enterprise network 12 (including components and resources within enterprise network 12) with cloud gateway 22. Cloud gateway 22 can also be responsible for establishing secure tunnel 18 for interconnecting cloud 14 (including components and resources within cloud 14) with cloud gateway 20. Cloud gateway 20 and/or cloud gateway 22 can be implemented on servers, switches, or other network elements. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In various embodiments, cloud gateway 20 can communicate with distributed virtual switches, such as a distributed virtual switch (DVS) 24 provisioned in enterprise network 12. DVS 24 can span servers 26(1)-26(T), functioning as a virtual switch across associated hosts in enterprise network 12. In various embodiments, servers 26(1)-26(T) can host virtual machines (VMs) 28(1)-28(N), enabled by one or more Virtual Ethernet Modules (VEMs) 30(1)-30(M). For example, in various embodiments, server 26(1) is provisioned with VEM 30(1) that provides network capability to VM 28(1) and VM 28(2); and server 26(T) is provisioned with VEM 30(M) that provides networking capability to VM 28(N). Enterprise network 12 can provide VMs 28(1)-28(N) with computing, storage, and networking services for running application workloads. An "application workload" as used herein can be inclusive of an executable file comprising instructions that can be understood and processed on a computer, and may further include library modules loaded during execution, object files, system files, hardware logic, software logic, or any other executable modules.

DVS 24 can also span enterprise storage 31 for storing data, such as an enterprise storage server. Enterprise storage 31 can be any suitable memory element configured to store data. In various embodiments, VMs 28(1)-28(N) can store data in enterprise storage 31. As used herein, "data" includes any type of numeric, voice, video, or script data, or any type of source or object code, or any other suitable information in any appropriate format that may be communicated from one point to another in electronic devices and/or networks.

A virtual supervisor module (VSM) 32 can be provisioned in enterprise network 12 that controls VEMs 30(1)-30(M) as a virtual switch. VEMs 30(1)-30(M) can be configured through VSM 32 to perform Layer 2 switching and advanced networking functions, such as port channels, quality of service (QoS), security (e.g., private virtual local area network (VLAN), port security, etc.), and monitoring (e.g., Netflow, switch port analyzer (SPAN), encapsulated remote SPAN, etc.). Network administrators can define configurations on all VEMs 30(1)-30(M) in enterprise network 12 from an interface, such as a vCenter 34 coupled to VSM 32. In various embodiments, vCenter 34 can be integrated with a server (not shown) that provides a console to operate and manage VSM 32. Together, DVS 24, VMs 28(1)-28(N), VEMs 30(1)-30(M), VSM 32, and vCenter 34 can form a virtual network.

A cloud manager 36 can provide a management platform (for example, in various embodiments, through a virtual machine) that runs in enterprise network 12. For example, in various embodiments, cloud manager 36 facilitates hybrid cloud operations in cloud 14, manages network resources in cloud 14 that are allocated to enterprise network 12, dynamically instantiates cloud gateway 20 and/or cloud gateway 22, performs various other management functions through an enterprise virtualization platform (for example, vCenter 34) and cloud provider application programming interfaces (APIs), various other management functions, or a combination thereof. Cloud manager 36 can also monitor health of substantially all components in enterprise network 12 and allocated resources in cloud 14, and provide high availability of such components based on particular needs.

In various embodiments, network resources of enterprise network 12 are extended into cloud 14 through a cloud Virtual Ethernet Module (cVEM) 42. cVEM 42 can be embedded in (or communicable with) cloud gateway 22 and can enable switching inter-virtual machine traffic at cloud 14. In various embodiments, cloud gateway 22 and cVEM 42 may together form a L2 switch. cVEM 42 can be configured to perform Layer 2 switching and advanced networking functions such as port-channels, quality of service (QoS), security (e.g., private virtual local area network (VLAN), port security, etc.), and monitoring (e.g., net-flow, switch port analyzer (SPAN), encapsulated remote SPAN, etc.). As used herein, the term "network resource" may encompass network elements, links (e.g., transmission connections between nodes in a network), and data, including computing resources (e.g., processors), and storage resources (e.g., storage devices, databases).

Applications, including their respective dependencies, libraries and other binaries, and configuration files needed to run them, may be executing in containers 40 deployed in the cloud 14 on respective hosts 42. Containers 40 can provide a network overlay, for example, to facilitate computing, storage, and networking services for running application workloads and connecting applications with enterprise network 12 and, in various embodiments, with various components of cloud 14. As will be described in greater detail below, a cluster manager 44 is provided and maintains a database 46 of all containers 40, including information for each container, such as on which host 42 the container resides as well as a list of all of the files in each container and respective checksums thereof. The database 46 also contains a list of all files in a shared file pool layer of each host 42 and the respective checksums thereof. The database 46 is updated by a container orchestration module (or container orchestrator) 48 each time a container is instantiated on or migrated to one of the hosts 42. In accordance with features of embodiments described herein, the container orchestrator may include software embodied in one or more tangible media for facilitating the activities described herein. In particular, the orchestrator may include software for facilitating some of the processes illustrated in and described with reference to FIGS. 2-4. The container orchestrator may also include one or more memory devices for storing information to be used in achieving the functions as outlined herein. Additionally, the container orchestrator may include a processor capable of executing software or an algorithm, to perform the functions as discussed in this specification, as well as various I/O drivers and interfaces necessary for performing the functions described herein.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

As noted above, in various embodiments, enterprise network 12 and cloud 14 form a hybrid cloud network environment. A hybrid cloud is a cloud infrastructure that includes two or more clouds that interoperate and federate through technology. For example, clouds in a hybrid cloud can interact with one another to allow network resources to be moved from one cloud to another. In various implementations, for example, resources that are part of a hybrid cloud but hosted in different clouds can interact with one another across clouds to exchange data and move resources from one cloud to another. In various implementations, a hybrid cloud facilitates interaction between a private cloud (such as that provided by enterprise network 12) and a public cloud (such as that provided by cloud 14), where the private cloud can join the public cloud to utilize the public cloud's resources in a secure and scalable way. The hybrid cloud model can provide several advantages over other cloud models, including but not limited to: enterprises can protect their existing investment; enterprises can maintain control over their sensitive data and applications; enterprises can maintain full control over their network resources; enterprises can scale their environment on demand. For enterprises, such advantages can facilitate significant cost savings, rapid deployment of application workloads, and/or quick resource provisioning.

As used herein, the term "interface" includes a point of interaction between software components (e.g., applications, VMs, etc.) that allows access to computer resources such as memory, processors (such as central processing units), and storage. Interfaces can specify routines, data structures, object classes, exceptions, method signatures, peripheral register and interrupt definitions, core peripheral functions, signal processing algorithms, etc. Interfaces can include application programming interfaces and other languages and codes that applications use to communicate with each other and with the hardware of the computer system on which they reside. Interfaces may be specific to an operating system or hardware. For example, each operating system and/or processor may have a separate and distinct interface.

Turning to the infrastructure of communication system 10, the network topology can include any number of servers, VMs, DVSs, VSMs, virtual routers, VSMs, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration. For example, enterprise network 12 and cloud 14 can include access switches, aggregation switches, core switches to aggregate and distribute ingress (upstream traffic), and egress (downstream traffic) traffic, etc. Switches (virtual and/or physical) can be provided at each access, aggregation, and core level to achieve redundancy within enterprise network 12. Further, cloud 14 can include elements particular to the type of network services provided; for example, in data centers that provide mass storage, cloud 14 can include Storage Area Networks (SANs).

The example network environment may be configured over a physical infrastructure that can include one or more networks and, further, can be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In accordance with features of embodiments described herein, techniques are disclosed for reducing aggregate container disk consumption across a cluster, at the file-level by identifying and moving unique files into a shared pool (at the host-level) and pointing non-unique files to the shared pool, utilizing cluster awareness, and placement/migration (orchestration) for optimal storage utilization. Conceptually, embodiments include identifying the common files across containers (deployed and to-be-deployed) on a given host. Additionally, embodiments optimize storage at the host-level by moving all files into a shared file pool. Within a host, the unique files across all containers deployed on that host are identified. These unique files are moved into a shared pool within the host. Common files across containers on the host are identified and one copy of is moved into the shared pool. Each container should only need the write layers; for the rest of the layers, pointers are placed in the shared pool. Storage is optimized across the cluster by migrating containers to hosts to achieve maximum file sharing. Once the foregoing identification and pooling of common files across all hosts in the cluster is performed, containers are migrated to hosts where they have more files in common with the existing containers. As a result, further optimization across the cluster is achieved. New containers are deployed on hosts that can achieve maximum file sharing.

Figure 2:
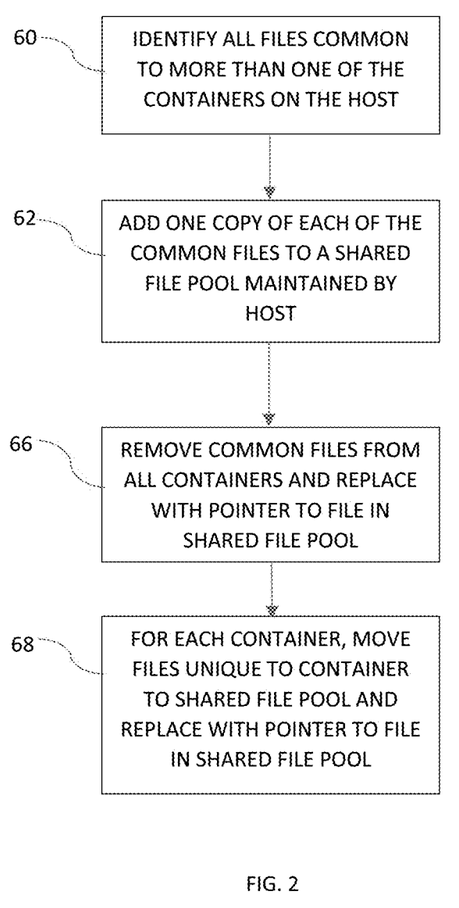
FIGS. 2-4 illustrate simplified flow charts illustrating example operations that may be performed in connection with techniques for cluster-wide container optimization and storage compression in accordance with embodiments described herein.

FIG. 2 is a simplified flowchart of a method for achieving container file storage optimization on a single host in accordance with embodiments described herein. It will be assumed for the sake of example that there are multiple containers on the host. Referring to FIG. 2, in step 60, all of the files common to more than one of the containers are identified. This may be accomplished by performing a hash function (MD5 checksum, for example) on each file, which will be used as the filename of the file in a shared file pool maintained on the host. In step 62, one copy of each of the common files identified in step 60 is added to the shared file pool. In step 64, for each of the containers, any common files included therein are removed from the container and replaced with a pointer to the file in the shared file pool. In step 66, for each of the containers, any files unique to the container are moved to the shared file pool and replaced with a pointer to the file in the shared file pool. As previously noted, each file in the shared file pool is identified by a filename comprising a checksum of the file. As a result of the steps illustrated in FIG. 2, all of the files previously stored in the individual containers on the host are stored in the shared file pool and replaced in the containers with pointers to the files, such that only a single copy of each of the files is maintained on the host.

As previously noted, a shared pool of files is maintained on every host. When a first container is deployed to a host, all of the files for the container are moved to the shared pool on that host. The files in the container (in the original Docker-created read layers) are replaced with pointers referencing the files in the shared file pool. The Docker-created write layer of the container remains as-is.

File searches are simplified by performing a hash function (MD5 checksum, for example) on each file, which is used as the file name in the shared file pool. When files for the first container are moved to the shared file pool, the hash function is performed on each file and the checksum is used as the file name in the shared file pool. The original Docker-created shared layers will have pointers referencing these checksum-named files in the shared file pool.

Figure 3:
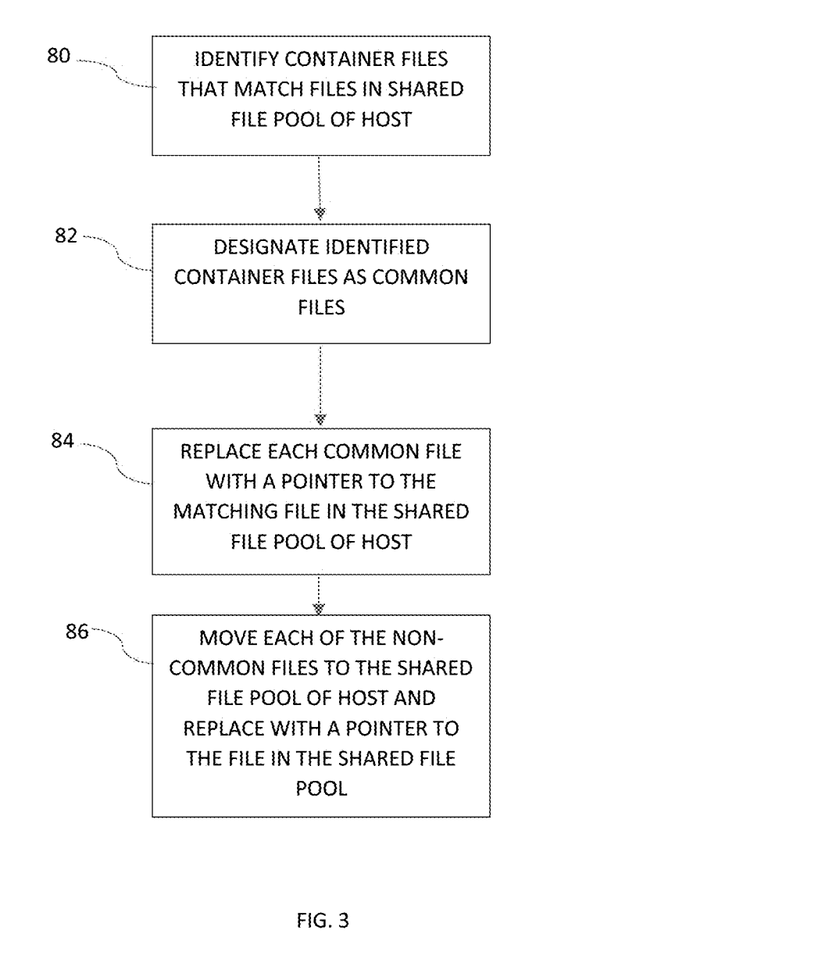

FIG. 3 is a simplified flowchart of steps for adding a new container to a host to achieve container file storage optimization on a single host in accordance with embodiments described herein. Referring to FIG. 3, in step 80, when a new container is deployed on the host, the files in the second container that match the files in the shared file pool are identified. This is accomplished by performing a hash function (e.g., a checksum) on the file contents and matching the checksum against the filenames of the files in the shared file pool. In step 82, each file of the new container that matches a file in the shared file pool is designated as a common file. In step 84, each of the common files is replaced in the container with a pointer to the matching file in the shared file pool. In step 86, each of the remaining files in the second container (i.e., the non-common files) is also moved to the shared file pool and replaced with a pointer to file in the shared file pool.

As a result of the foregoing, a single copy of files common to both containers exists in the shared file pool. Additionally, files unique to each container are also included in the shared file pool. The container directory structure and the original Docker-created shared layers are not modified; however, instead of actual files, the directories in the containers contain pointers to the files in the shared file pool. The process illustrated in FIG. 3 is repeated for each container added to the host. As a result, all files common to more than one container appear only once in the shared file pool (instead of once in each container), thereby providing file-level storage optimization. All files unique to a single container also appear in the shared file pool to be compared against files of new containers subsequently added to the host.

As previously noted, a cluster manager maintains a database of all containers, including information for each container such as which host the container resides on and a list of all of the files in each container and their respective checksums. The cluster manager database also contains a list of all files in the shared file pool layer of each host and their checksums. This database is updated by the container orchestrator each time a container is instantiated or migrated.

In accordance with features of embodiments described herein, each time a new container is deployed, a cluster manager database lookup is performed to identify which host in the cluster has the closest match in terms of common files (to achieve maximum sharing of storage), and the container is deployed on that host.

Figure 4:
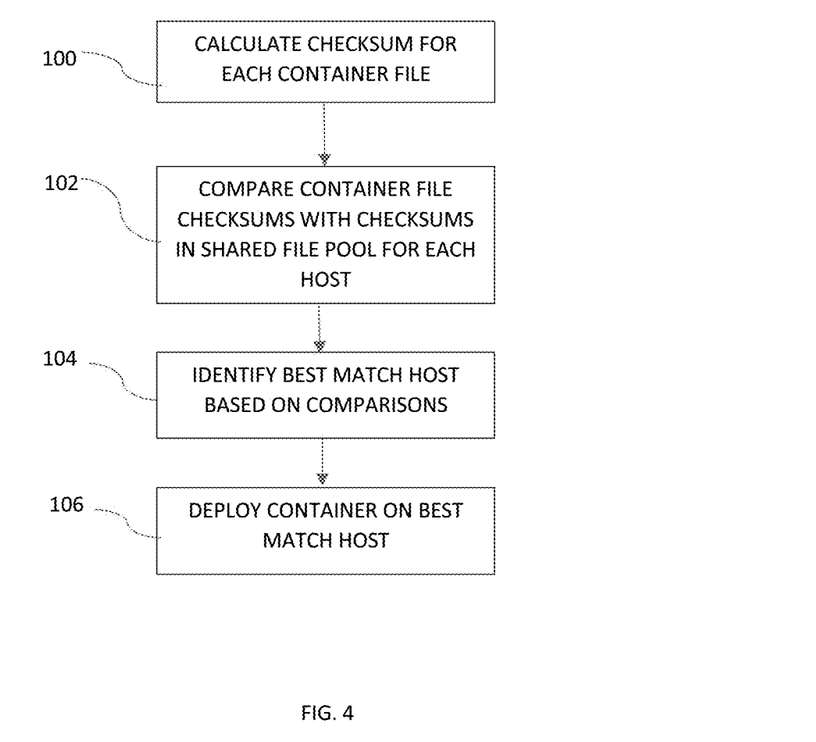

Referring to FIG. 4, in step 100, a checksum is calculated (i.e., the filename is determined) for each of the files of the container being deployed. In step 102, the checksums calculated in step 100 are compared with the checksums in the shared file pool for each host. In step 104, the host that is the best match for the container is identified. The "best match" host may be the host with the shared file pool having the most files in common with or the highest percentage of common storage with the container being deployed. In step 106, the container is deployed on the host identified in step 104 and the process illustrated in FIG. 3 is performed.

Figure 5:
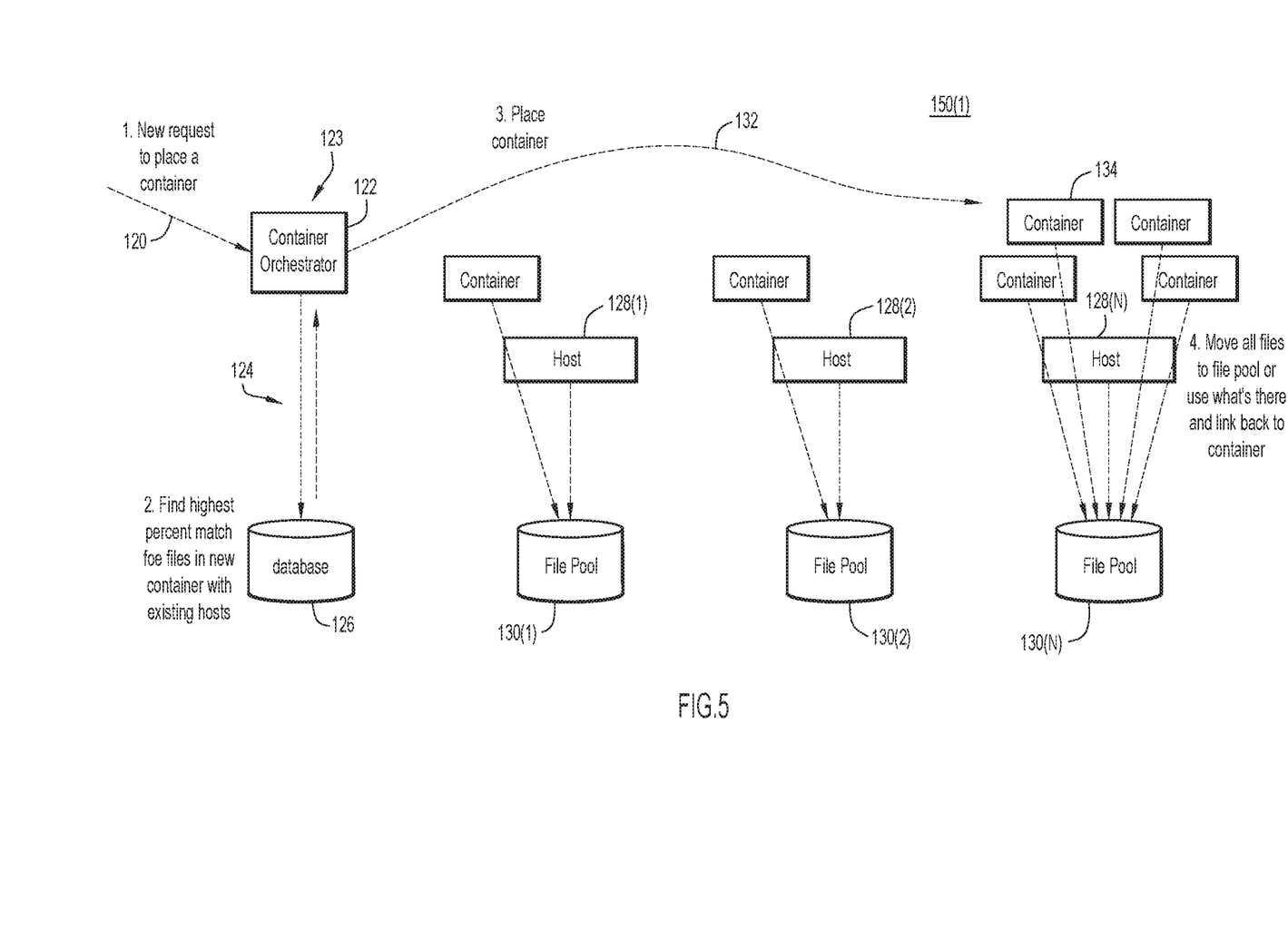
FIG. 5 illustrates a pictorial representation of a process for optimizing selection of a host on which to deploy a new container in accordance with embodiments described herein.

FIG. 5 is a pictorial representation of the process illustrated in FIG. 4. As shown in FIG. 5, at a step 120, a request to place a container is received at a container orchestrator 122 of a cluster manager 123. At a step 124, the container orchestrator 122 performs a search of a container database 126 of the cluster manager 123 to determine which of a cluster of hosts 128(1)-128(N) has a shared file pool 130(1)-130(N) with the highest percentage of files that match the files of the new container. It will be assumed for the sake of example that the host having a shared pool with the highest percentage of matching files is the host 130(N). At a step 132, the container (represented by a container 134) is deployed at the host 130(N). At that point, the process illustrated in FIG. 3 is performed for the container 134.

Figure 6:
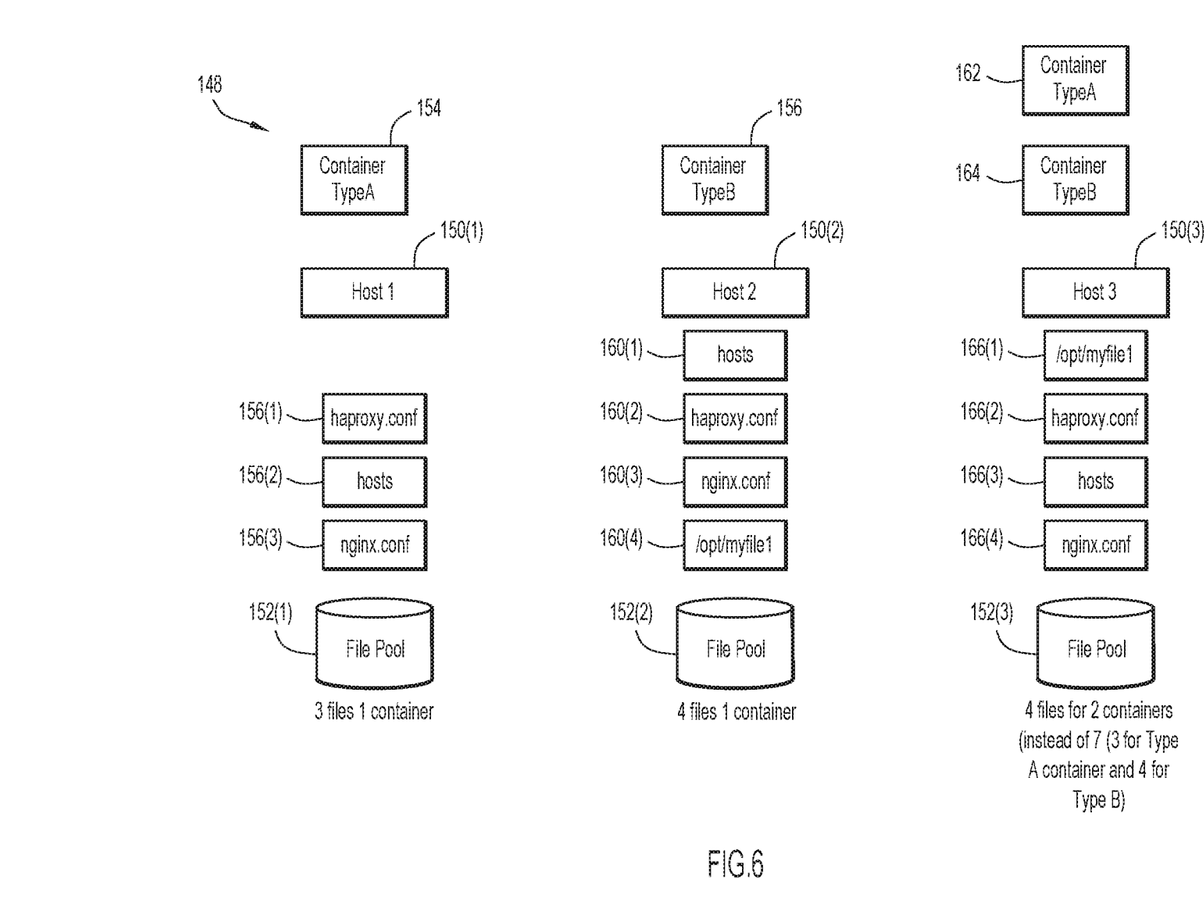
FIGS. 6-7 illustrate a pictorial representation of a process for optimizing disk usage across a cluster in accordance with embodiments described herein.
Figure 7:
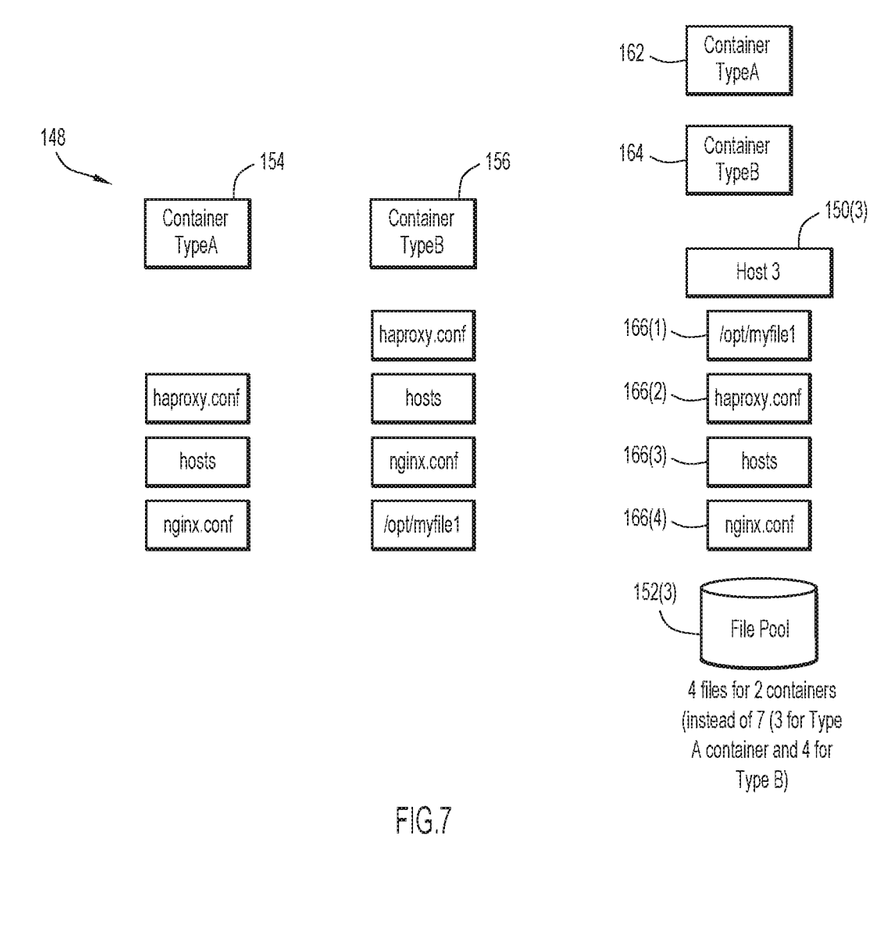

As a cluster evolves, a cluster manager performs periodic calculations with regard to each container to determine whether the container is located on the right host to optimize disk usage (on the host and across the cluster). If necessary, one or more containers may be migrated to other hosts; for example, if there is a better fit in terms of common files and storage optimization. Such migration could be performed at run time (i.e., live migrations) or during scheduled cluster downtimes or maintenance windows. After a container is or containers are migrated, the container database is updated to reflect the new placement of containers on host and the new filenames (checksums) in the shared file pool layer of each host. This process can be performed continually throughout the growth and/or evolution of the cluster. This technique is illustrated in FIGS. 6 and 7. Referring first to FIG. 6, a cluster 148 includes three hosts 150(1)-150(3), each having associated therewith a respective one of three shared file pools 152(1)-152(3). A container 154 of a first container type ("Container Type A") is deployed on the host 150(1) and has associated therewith three files 156(1)-156(3) stored in the shared file pool 152(1). A container 158 of a second container type ("Container Type B") is deployed on the host 150(2) and has associated therewith three files 160(1)-160(4) stored in the shared file pool 152(2). It will be noted that both Container Type A and Container Type B include files named haproxy.conf (files 156(1) and 162(2)) and nginx.conf (files 156(3) and 162(3)).

Finally, a container 162 of the first container type ("Container Type A") and a container 164 of a second container type ("Container Type B") are deployed on the host 150(3) and have associated therewith a total of four files 166(1)-166(4) stored in the shared file pool 152(3). In accordance with features of embodiments described herein, as a result of the periodic calculations performed by the cluster manager, it will be determined that containers 154 and 158 should be migrated to host 150(3) because the shared file pool 152(3) already includes copies of all of the files of those two containers. The result of this migration is illustrated in FIG. 7. It will be recognized that the goal in the rebalancing scenario illustrated in FIG. 7 is to have both of the container types on the same host to the extent possible or practical, considering Disaster Recovery ("DR") and/or High Availability ("HA") scenarios. The containers could be migrated to either of the other hosts shown in FIG. 7 as long as they are co-located. The cluster rebalancing would likely be one weighted factor of a cluster rebalance in which containers are running because the more containers that are on a host, the more that host will attract additional containers due to the variety of files included in the hosts shared file pool. As a result, other factors, such as anti-affinity for HA and/or DR purposes, as well as a maximum percentage (e.g., 80%) of resources consumed may be factored into the decision as well.

As a cluster evolves, a cluster manager performs periodic calculations with regard to each container to determine whether the container is located on the right host to optimize disk usage (on the host and across the cluster). If necessary, one or more containers may be migrated to other hosts; for example, if there is a better fit in terms of common files and storage optimization. Such migration could be performed at run time (i.e., live migrations) or during scheduled cluster downtimes or maintenance windows.

For large scale clusters, the cluster manager database could be implemented in Hadoop and a Map-Reduce scheme could be utilized to identify hosts for new container placement, as well as to periodically determine better container host placement for migration purposes.

By following the above-described technique to optimize new and/or existing clusters, it can be ensured that containers with the most common files are deployed on the same host, thereby achieving both per-host and cluster-wide storage optimization and efficiency. As described herein, new containers are deployed on the optimum hosts and containers are rebalanced periodically. Once all of the containers have been redeployed and shared file pools updated, the overall cluster will be optimized from a disk usage perspective.

Embodiments described herein achieve cluster-wide storage reduction and container optimization (i.e., reduced footprints). In particular, file-level comparison of container storage on the same host and across the cluster enable identification of similar/same files across all layers and containers. All files in a container are moved into a shared file pool on the host and all files in existing container layers are replaced with pointers that refer to the files in the shared file pool. A hash function (or checksum) is used as the filename of each file in the shared file pool. The hash function is performed on files of new containers and compared against filenames in the shared file pool to identify files in in the file pool that are identical to the files of the new container. Only one copy of all identical files across all containers on a host, as well as all layers, is maintained. All non-identical files across all containers on a host are also moved to the shared file pool.

A cluster manager maintains a database of all containers, their files and checksums, and which host the containers reside on. The cluster manager maintains a database of all filenames (checksums) in the shared file pool of every host. The optimal host for a container is determined based on maximum storage optimization/reduction during initial container placement. Periodic and on-going recalculations are performed to determine whether each container is deployed on the optimal host (for storage optimization). As the cluster evolves/grows, periodic migration and rebalancing of containers to more optimal hosts (for storage optimization) may be performed. Hadoop may be used to maintain the cluster manager (container/file/host/checksum) database and Map-Reduce may be used for faster and/or more efficient identification of optimal hosts.

Figure 8:
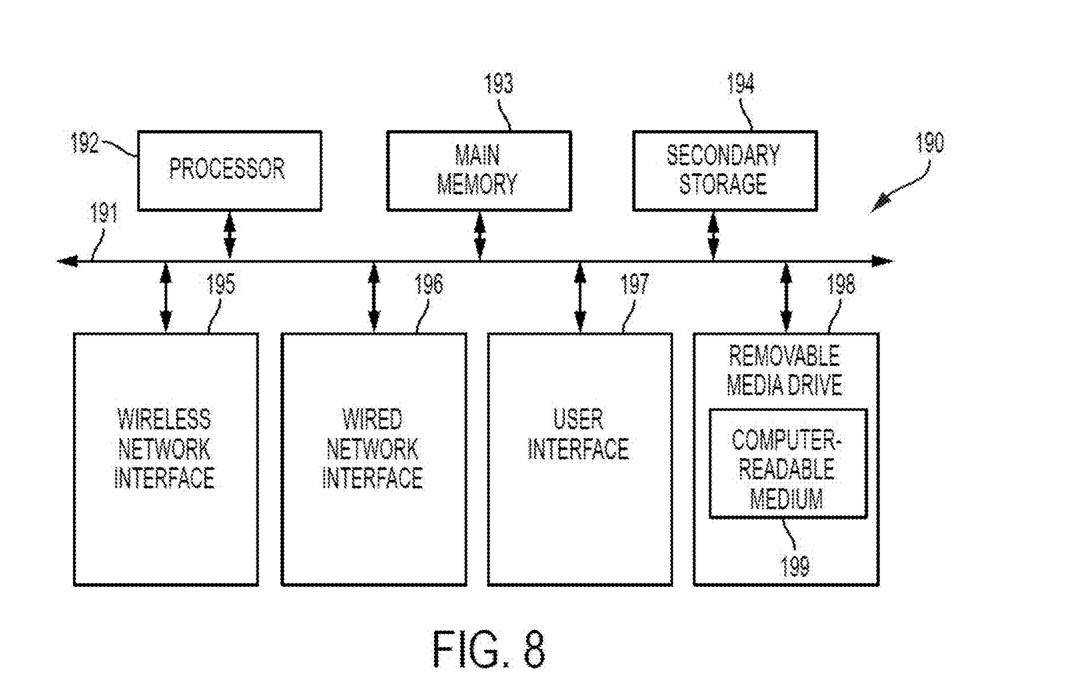
FIG. 8 is a simplified block diagram of a machine comprising an element of a communications network according to one or more examples of embodiments described herein.

Turning to FIG. 8, FIG. 8 illustrates a simplified block diagram of an example machine (or apparatus) 190, which in certain embodiments may be a host or a switch, that may be implemented in embodiments described herein. The example machine 190 corresponds to network elements and computing devices that may be deployed in a communications network. In particular, FIG. 8 illustrates a block diagram representation of an example form of a machine within which software and hardware cause machine 190 to perform any one or more of the activities or operations discussed herein. As shown in FIG. 8, machine 190 may include a processor 192, a main memory 193, secondary storage 194, a wireless network interface 195, a wired network interface 196, a user interface 197, and a removable media drive 198 including a computer-readable medium 199. A bus 191, such as a system bus and a memory bus, may provide electronic communication between processor 192 and the memory, drives, interfaces, and other components of machine 190.

Processor 192, which may also be referred to as a central processing unit ("CPU"), can include any general or special-purpose processor capable of executing machine readable instructions and performing operations on data as instructed by the machine-readable instructions. Main memory 193 may be directly accessible to processor 192 for accessing machine instructions and may be in the form of random access memory ("RAM") or any type of dynamic storage (e.g., dynamic random access memory ("DRAM")). Secondary storage 194 can be any non-volatile memory such as a hard disk, which is capable of storing electronic data including executable software files. Externally stored electronic data may be provided to computer 190 through one or more removable media drives 198, which may be configured to receive any type of external media such as compact discs ("CDs"), digital video discs ("DVDs"), flash drives, external hard drives, etc.

Wireless and wired network interfaces 195 and 196 can be provided to enable electronic communication between machine 190 and other machines, or nodes. In one example, wireless network interface 195 could include a wireless network controller ("WNIC") with suitable transmitting and receiving components, such as transceivers, for wirelessly communicating within a network. Wired network interface 196 can enable machine 190 to physically connect to a network by a wire line such as an Ethernet cable. Both wireless and wired network interfaces 195 and 196 may be configured to facilitate communications using suitable communication protocols such as, for example, Internet Protocol Suite ("TCP/IP"). Machine 190 is shown with both wireless and wired network interfaces 195 and 196 for illustrative purposes only. While one or more wireless and hardwire interfaces may be provided in machine 190, or externally connected to machine 190, only one connection option is needed to enable connection of machine 190 to a network.

A user interface 197 may be provided in some machines to allow a user to interact with the machine 190. User interface 197 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 198 represents a drive configured to receive any type of external computer-readable media (e.g., computer-readable medium 199). Instructions embodying the activities or functions described herein may be stored on one or more external computer-readable media. Additionally, such instructions may also, or alternatively, reside at least partially within a memory element (e.g., in main memory 193 or cache memory of processor 192) of machine 190 during execution, or within a non-volatile memory element (e.g., secondary storage 194) of machine 190. Accordingly, other memory elements of machine 190 also constitute computer-readable media. Thus, "computer-readable medium" is meant to include any medium that is capable of storing instructions for execution by machine 190 that cause the machine to perform any one or more of the activities disclosed herein.

Not shown in FIG. 8 is additional hardware that may be suitably coupled to processor 192 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 190 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 190 to appropriately manage the operation of the hardware components therein.

The elements, shown and/or described with reference to machine 190, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 193, secondary storage 194, computer-readable medium 199) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 192) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   identifying, by a network element comprising a processor and a memory device, a common file associated with a first software container deployed on a host, wherein the common file comprises a file that is common to both the first software container and a second software container deployed on the host;
   for the common file:
      adding a single copy of the common file to a shared file pool maintained by the host;
      removing the common file from the first software container and replacing the common file removed from the first software container with a pointer to the single copy of the common file added to the shared file pool; and
      removing the common file from the second software container and replacing the common file removed from the second software container with a pointer to the single copy of the common file added to the shared file pool;
   identifying by the network element a unique file associated with the first software container, wherein the unique file comprises a file that is not common to any other software container deployed on the host;
   for the unique file:
      moving the unique file to the shared file pool maintained by the host; and
      removing the unique file from the first software container and replacing the unique file removed from the first software container with a pointer to the unique file in the shared file pool; and
   subsequent to deployment of a new software container on the host:
      if a new file associated with the new software container matches one of the files stored in the shared file pool, removing the new file associated with the new software container from the new software container and replacing it with a pointer to the matched one of the files stored in the shared file pool; and
      if the new file of the new software container does not match one of the files stored in the shared file pool, moving the file associated with the new software container to the shared file pool and replacing it with a pointer to the moved file in the shared file pool.

2. The method of claim 1, wherein the new software container has a plurality of files associated therewith, the method further comprising repeating the removing and moving with respect to each of the files associated with the new software container.

3. The method of claim 1, further comprising comparing a name of the new file associated with the new software container with filenames of the files stored in the shared file pool.

4. The method of claim 3, wherein for each of the files, a filename of each of the files comprises a hash of contents of each of the files.

5. The method of claim 1, wherein the host comprises one of a plurality of hosts comprising a cluster and wherein each of the plurality of hosts includes a shared file pool, the method further comprising selecting one of the plurality of hosts on which to deploy the new software container, wherein the selecting is performed with reference to the shared file pools of each of the plurality of hosts.

6. The method of claim 5, wherein the selecting further comprises:
for each shared file pool of each of the plurality of hosts, comparing files associated with the new software container with files stored in the shared file pool of each of the plurality of hosts to determine a percentage of files associated with the new software container that match files stored in the shared file pool of each of the plurality of hosts; and
deploying the new software container on the one of the plurality of hosts having the shared file pool with a highest percentage of matching files.

7. One or more non-transitory tangible media that includes code for execution and when executed by a processor is operable to perform operations comprising:
identifying, by a network element comprising a processor and a memory device, a common file associated with a first software container deployed on a host, wherein the common file comprises a file that is common to both the first software container and a second software container deployed on the host;
for the common file:
adding a single copy of the common file to a shared file pool maintained by the host;
removing the common file from the first software container and replacing the common file removed from the first software container with a pointer to the single copy of the common file added to the shared file pool; and
removing the common file from the second software container and replacing the common file removed from the second software container with a pointer to the single copy of the common file added to the shared file pool;
identifying by the network element a unique file associated with the first software container, wherein the unique file comprises a file that is not common to any other software container deployed on the host;
for the unique file:
moving the unique file to the shared file pool maintained by the host; and
removing the unique file from the first software container and replacing the unique file removed from the first software container with a pointer to the unique file in the shared file pool; and
subsequent to deployment of a new software container on the host:
if a new file associated with the new software container matches one of the files stored in the shared file pool, removing the new file associated with the new software container from the new software container and replacing it with a pointer to the matched one of the files stored in the shared file pool; and
if the new file of the new software container does not match one of the files stored in the shared file pool, moving the file associated with the new software container to the shared file pool and replacing it with a pointer to the moved file in the shared file pool.

8. The media of claim 7, wherein the new software container has a plurality of files associated therewith, the operations further comprising repeating the removing and moving with respect to each of the files associated with the new software container.

9. The media of claim 7, wherein the host comprises one of a plurality of hosts comprising a cluster and wherein each of the plurality of hosts includes a shared file pool, the operations further comprising selecting one of the plurality of hosts on which to deploy the new software container, wherein the selecting is performed with reference to the shared-file pools of each of the plurality of hosts.

10. The media of claim 9, wherein the selecting further comprises:
for each shared file pool of each of the plurality of hosts, comparing files associated with the new software container with files stored in the shared file pool of each of the plurality of hosts to determine a percentage of files associated with the new software container that match files stored in the shared file pool of each of the plurality of hosts; and
deploying the new software container on the one of the plurality of hosts having the shared file pool with a highest percentage of matching files.

11. The media of claim 10, wherein the comparing is performed by comparing a name of the files associated with the new software container with filenames of the files stored in the shared file pool of each of the plurality of hosts, and wherein for each of the files, a filename of each of the files comprises a hash of contents of each of the files.

12. An apparatus comprising:
a memory element configured to store data; and
a processor operable to execute instructions associated with the data;
the apparatus configured for:
identifying a common file associated with a first software container deployed on a host, wherein the common file comprises a file that is common to both the first software container and a second software container deployed on the host;
for the common file:
adding a single copy of the common file to a shared file pool maintained by the host;
removing the common file from the first software container and replacing the common file removed from the first software container with a pointer to the single copy of the common file added to the shared file pool; and
removing the common file from the second software container and replacing the common file removed from the second software container with a pointer to the single copy of the common file added to the shared file pool;
identifying a unique file associated with the first software container, wherein the unique file comprises a file that is not common to any other software container deployed on the host;
for the unique file:
moving the unique file to the shared file pool maintained by the host; and
removing the unique file from the first software container and replacing the unique file removed from the first software container with a pointer to the unique file in the shared file pool; and
subsequent to deployment of a new software container on the host:
if a new file associated with the new software container matches one of the files stored in the shared file pool, removing the new file associated with the new software container from the new software container and replacing it with a pointer to the matched one of the files stored in the shared file pool; and
if the new file of the new software container does not match one of the files stored in the shared file pool, moving the file associated with the new software container to the shared file pool and replacing it with a pointer to the moved file in the shared file pool.

13. The apparatus of claim 12, wherein the new software container has a plurality of files associated therewith, the apparatus further configured for repeating the removing and moving with respect to each of the files associated with the new software container.

14. The apparatus of claim 12, wherein the host comprises one of a plurality of hosts comprising a cluster and wherein each of the plurality of hosts includes a shared file pool, the apparatus further configured for selecting one of the plurality of hosts on which to deploy the new software container, wherein the selecting is performed with reference to the shared file pools of each of the plurality of hosts.

15. The apparatus of claim 14, wherein the selecting further comprises:
for each shared file pool of each of the plurality of hosts, comparing files associated with the new software container with files stored in the shared file pool of each of the plurality of hosts to determine a percentage of files associated with the new software container that match files stored in the shared file pool of each of the plurality of hosts; and
deploying the new software container on the one of the plurality of hosts having the shared file pool with a highest percentage of matching files, wherein the comparing is performed by comparing a name of the file associated with the new software container with filenames of the files stored in the shared file pool of each of the plurality of hosts, and wherein for each of the files, a filename of each of the files comprises a hash of contents of each of the files.

16. The method of claim 1, wherein the method is performed for a plurality of files for each of the first software container and the second software container.

17. The media of claim 7, wherein the operations are performed for a plurality of files for each of the first software container and the second software container.

18. The media of claim 7, further comprising comparing a name of the new file associated with the new software container with filenames of the files stored in the shared file pool.

19. The media of claim 18, wherein for each of the files, a filename of each of the files comprises a hash of contents of each of the files.

20. The apparatus of claim 12, further comprising comparing a name of the new file associated with the new software container with filenames of the files stored in the shared file pool.

* * * * *